(12) United States Patent
Santoro et al.

(10) Patent No.: US 9,541,232 B1
(45) Date of Patent: Jan. 10, 2017

(54) BI-POD CANTILEVER MOUNT FOR LASER METROLOGY APPARATUS AND METHOD

(71) Applicants: Robert J. Santoro, Cherry Hill, NJ (US); Pinkesh Bharatia, Cherry Hill, NJ (US)

(72) Inventors: Robert J. Santoro, Cherry Hill, NJ (US); Pinkesh Bharatia, Cherry Hill, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 219 days.

(21) Appl. No.: 14/573,437

(22) Filed: Dec. 17, 2014

(51) Int. Cl.
*G01B 11/16* (2006.01)
*F16M 13/02* (2006.01)
*B63B 35/00* (2006.01)
*B63B 9/00* (2006.01)

(52) U.S. Cl.
CPC .............. *F16M 13/022* (2013.01); *B63B 9/00* (2013.01); *B63B 35/00* (2013.01); *G01B 11/16* (2013.01)

(58) Field of Classification Search
CPC ......... G01B 3/563; G01B 5/18; G01C 15/004; G01C 15/06; G01C 3/08; G01N 2021/8822; G01N 2021/8861; G01N 2021/8867; G01N 21/65; G01N 21/8422; G01N 21/958; G01N 29/2418
See application file for complete search history.

(56) References Cited

U.S. PATENT DOCUMENTS

| | | | | |
|---|---|---|---|---|
| 4,967,497 A | * | 11/1990 | Yakscoe | F16M 11/32 42/94 |
| 7,369,097 B1 | | 5/2008 | Sherwood | |
| 8,408,505 B2 | | 4/2013 | Ye | |
| 2006/0091109 A1 | * | 5/2006 | Partlo | B08B 7/00 216/63 |
| 2007/0261287 A1 | * | 11/2007 | Hunt | F41A 23/08 42/94 |
| 2009/0249674 A1 | * | 10/2009 | Boord | F16M 11/24 42/94 |
| 2013/0134268 A1 | * | 5/2013 | Wessells | F16B 17/00 248/125.8 |

* cited by examiner

*Primary Examiner* — Michael P Stafira
(74) *Attorney, Agent, or Firm* — Dave A. Ghatt

(57) ABSTRACT

A Bi-Pod cantilever mount and method for supporting laser metrology equipment on a surface. The cantilever mount includes an adjustable mast and legs for adjustably positioning the laser metrology equipment on one or more surfaces. The adjustability of the mount optimizes the ability to utilize the laser metrology equipment at locations where it has been traditionally difficult to take readings.

11 Claims, 3 Drawing Sheets

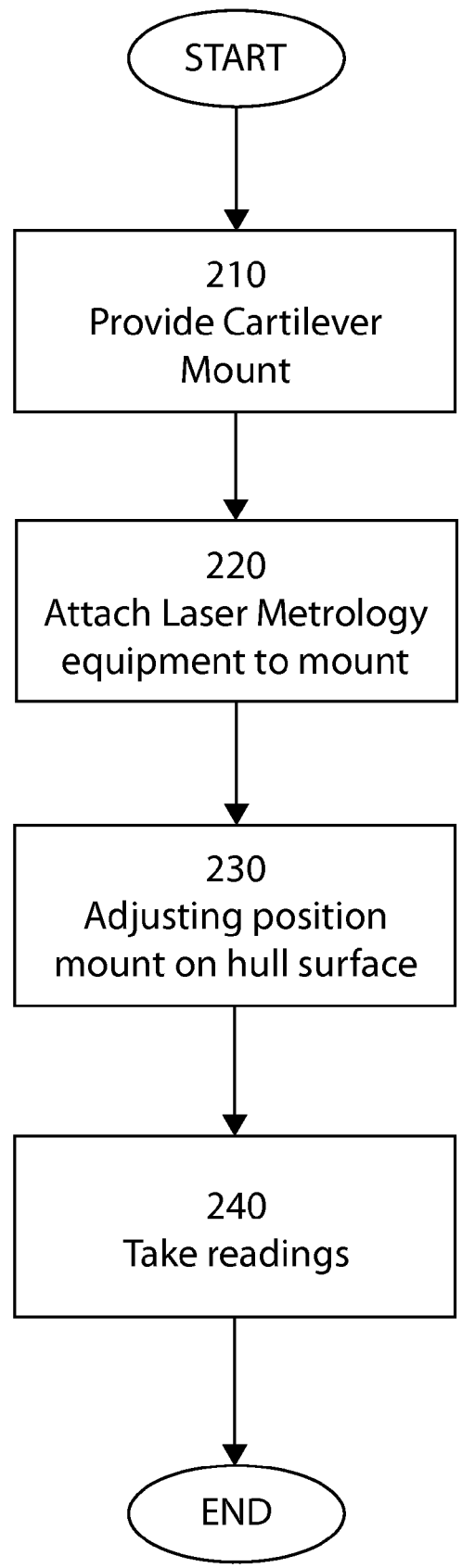

US 9,541,232 B1

BI-POD CANTILEVER MOUNT FOR LASER METROLOGY APPARATUS AND METHOD

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a mounting device, more particularly, a Bi-Pod cantilever mount for supporting laser metrology equipment on one or more surfaces. The description also relates to a method of taking laser metrology readings using the mounting device.

BACKGROUND

When at sea, ships may be damaged as a result of various reasons, including collision with another vessel, grounding, or even weapon strike. Laser metrology equipment is a very important means for obtaining data related to the damage to facilitate damage control. There are no known mounts for accommodating the mounting of laser metrology equipment over the side of a waterborne ship to capture accurate data for damage control incidents. For an afloat ship, because of the lack of a versatile mounting arrangement, it is not possible to set up data-capturing equipment pier-side or on an adjacent ship, and properly obtain valid and accurate data from a target ship. Thus, it is desired to have a mounting apparatus that has the capability of holding the laser metrology equipment and also the flexibly to position the laser metrology equipment to facilitate data collection when the hull is damaged.

SUMMARY

In one aspect, the invention is a cantilever mount for supporting laser metrology equipment on one or more surfaces. The cantilever mount includes a hip support having a first leg opening and a second leg opening. In this aspect, the invention also includes an adjustable mast being elongated in an XY plane of an XYZ coordinate system, with the adjustable mast having a far end. The cantilever mount also includes an attachment device for holding and attaching the laser metrology equipment. The attachment device is connected to the far end of the mast. The cantilever mount further includes a first leg having an anchor end and a hip end. The first leg is elongated in the XY plane, with the hip end positioned within the first leg opening. In this aspect, the invention also include a second leg having an anchor end and a hip end, with the second leg elongated in the XY plane, and with the hip end positioned within the second leg opening. In this aspect, a first anchor is mounted at the anchor end of the first leg, with the first anchor being positioned below the first leg in a Z-direction of the XYZ coordinate system. A second anchor is mounted at the anchor end of the second leg, with the second anchor below the second leg in the Z-direction of the XYZ coordinate system. A third anchor is mounted at the hip support, with the third anchor below the hip support in the Z-direction of the XYZ coordinate system. In this aspect, each of the first anchor, the second anchor, and the third anchor contact the one or more surfaces upon which the cantilever mount is supported.

In another aspect, the invention is a method of taking laser metrology data readings on a ship. The method includes the providing of a cantilever mount for supporting laser metrology equipment on one or more surfaces. The cantilever mount has a hip support having a first leg opening and a second leg opening. The cantilever mount also includes an adjustable mast being elongated in an XY plane of an XYZ coordinate system, with the adjustable mast having a far end. The cantilever mount also has an attachment device for holding and attaching the laser metrology equipment, with the attachment device connected to the far end of the mast. The cantilever mount also has a first leg having an anchor end and a hip end, the first leg being elongated in the XY plane, with the hip end positioned within the first leg opening. Also included is a second leg having an anchor end and a hip end, with the second leg elongated in the XY plane with the hip end positioned within the second leg opening. A first anchor is mounted at the anchor end of the first leg. The first anchor is positioned below the first leg in a Z-direction of the XYZ coordinate system. A second anchor is mounted at the anchor end of the second leg. The second anchor is positioned below the second leg in the Z-direction of the XYZ coordinate system. The cantilever mount also has a third anchor mounted at the hip support, with the third anchor below the hip support in the Z-direction of the XYZ coordinate system. Each of the first anchor, the second anchor, and the third anchor contact the one or more surfaces upon which the cantilever mount is supported. In this aspect, the method of taking laser metrology data readings further includes the attaching of laser metrology equipment to the cantilever mount, wherein the laser metrology equipment is fastened to the attachment device at the far end of the adjustable mast. The method also includes adjustably positioning the cantilever mount on one or more hull surfaces of the ship. The method further includes the taking of data readings with the laser metrology equipment.

BRIEF DESCRIPTION OF THE DRAWINGS

Other features will be apparent from the description, the drawings, and the claims.

FIG. 2 is an exemplary flow chart showing a method of taking laser metrology readings on a ship hull, according to an embodiment of the invention.

DETAILED DESCRIPTION

Figure 1A:
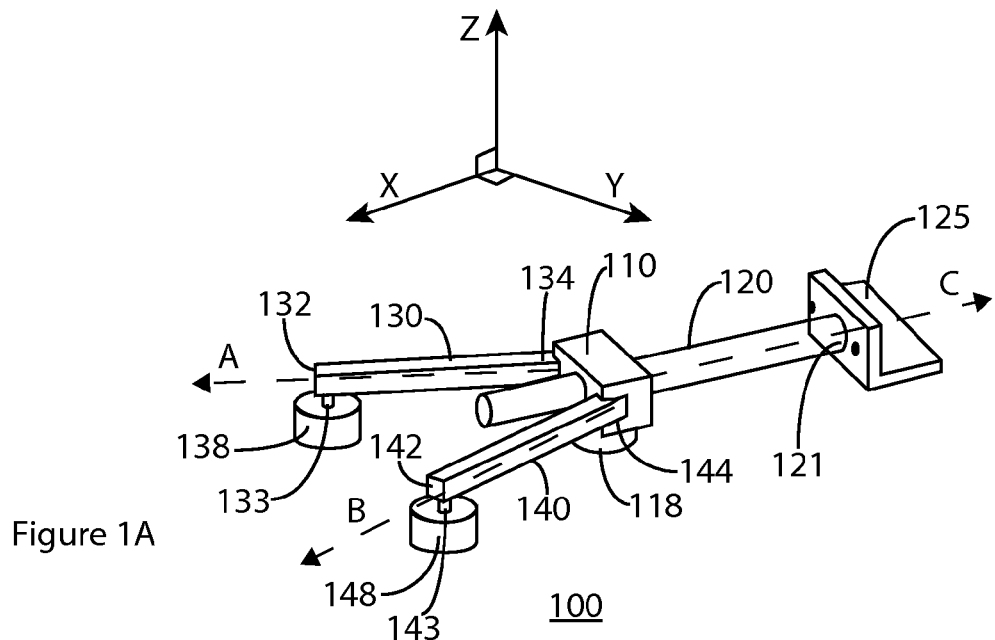
FIG. 1A is an exemplary perspective illustration of a cantilever mount for supporting laser metrology equipment on one or more surfaces, according to an embodiment of the invention.

FIG. 1A is a perspective illustration of a Bi-Pod cantilever mount 100 for supporting laser metrology equipment on one or more surfaces, according to an embodiment of the invention. The cantilever mount 100 as illustrated is a versatile mounting apparatus for laser metrology equipment that may for example, be used on the hull of a water vessel. The cantilever mount 100 is designed to hold the laser metrology equipment and to position the equipment to facilitate data collection in circumstances that have been traditionally difficult for data collection, or generally in non-standard applications. For example, the cantilever mount 100 may be used to extend the laser metrology equipment into an open doorway or hatchway. Alternatively, the cantilever mount 100 could be adjusted and hung from an overhead position that is ideal the laser metrology equipment to capture data. According to one particular embodiment of the invention, the cantilever mount 100 may be utilized in situations where the side of a ship hull has been damaged, to properly obtain information pertaining to this damage.

As outlined throughout the written description, and as illustrated in FIG. 1A, the cantilever mount 100 is referenced with respect to an XYZ Cartesian coordinate system. The major elements of the cantilever mount 100, such as the mast, the hip support, and first and second legs, all outlined below, may be made from a lightweight strong material such as carbon fiber, or a metallic material such as aluminum and the like. Composite materials may also be used.

Figure 1B:
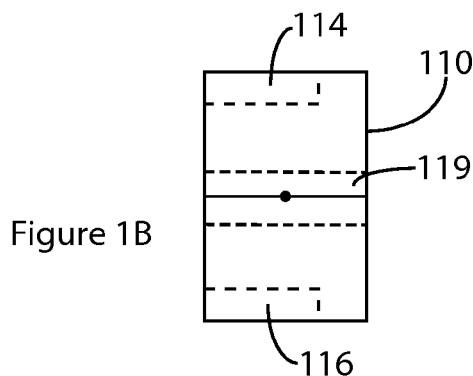
FIG. 1B is an exemplary top view of the hip support of the cantilever mount, according to an embodiment of the invention.

As shown in FIG. 1A, the cantilever mount 100 includes a hip support 110, which links and houses some of the elements of the mount 100. FIG. 1B is an exemplary top view of the hip support 110. As shown, the hip support 110 includes a first leg opening 114 and a second leg opening 116, for receiving legs, as outlined below. The hip support 110 also includes a central bore hole 119, through which a mast is mounted.

Returning to FIG. 1A, as shown, the cantilever mount 100 has a mast 120. The mast 120 has an elongation axis C that is elongated and extends in an XY plane. The mast 120 extends from the hip support 110, and is threaded through the central bore hole 119. The mast 120 has a far end 121, having an attachment device 125 for holding and attaching the laser metrology equipment to the mount 100. The attachment device 125 may include known devices such as tethers, hook and loop arrangements, hooks, clips, straps, bolts, screws, and the like to secure the laser metrology equipment to the adjustable mast 120 of the mount 100.

FIG. 1A shows a first leg 130 having an anchor end 132 and a hip end 134. As shown, the first leg 130 has an elongation axis A that is elongated and extends in the XY plane. The hip end 134 is positioned within the first leg opening 114 of the hip support 110. FIG. 1A shows a second leg 140 having an anchor end 142 and a hip end 144. The second leg 140 has an elongation axis B that is elongated and extends in the XY plane. The hip end 144 is positioned within the second leg opening 116 of the hip support 110.

FIG. 1A shows a first anchor 138 mounted at the anchor end of the first leg 132. As shown, with respect to the XYZ coordinate system, the first anchor 138 is mounted below the first leg 130 in a Z-direction. A second anchor 148 is mounted at the anchor end 142 of the second leg 140. Again, with respect to the XYZ coordinate system, the second anchor 148 is mounted below the second leg 140 in the Z-direction. A third anchor 118 is mounted at the hip support 110. With respect to the XYZ coordinate system as shown, the third anchor 118 is mounted below the hip support 110 in the Z-direction. As outlined below, in operation, each of the first anchor 138, the second anchor 148, and the third anchor 118 contact the surface or surfaces upon which the cantilever mount 100 is supported.

According to an embodiment of the invention, each of the first, second and third anchors, 138, 148, and 118 are magnetic. The magnets may be powerful rare earth magnets or the like, or other known magnets. This allows the cantilever mount 100 to be positioned on one or more ferrous surfaces in any desired orientation. For example, the cantilever mount 100 may be attached to one or more ferrous surfaces that are horizontal, vertical, or inclined.

According to another embodiment, the anchors 138, 148, and 118 may be clamps having a hook or an opening (not shown) through which a securing device such as a screw, a bolt, or the like may be threaded for attaching the respective anchor 138, 148, or 118 to the one or more surfaces. According to this embodiment, the one or more surfaces may include compression panels that are able to receive securing devices such as screws e.g., at any desired location along that surface. This facilitates the flexible positioning of the mount 100 at any position on the one or more surfaces.

Figure 1C:
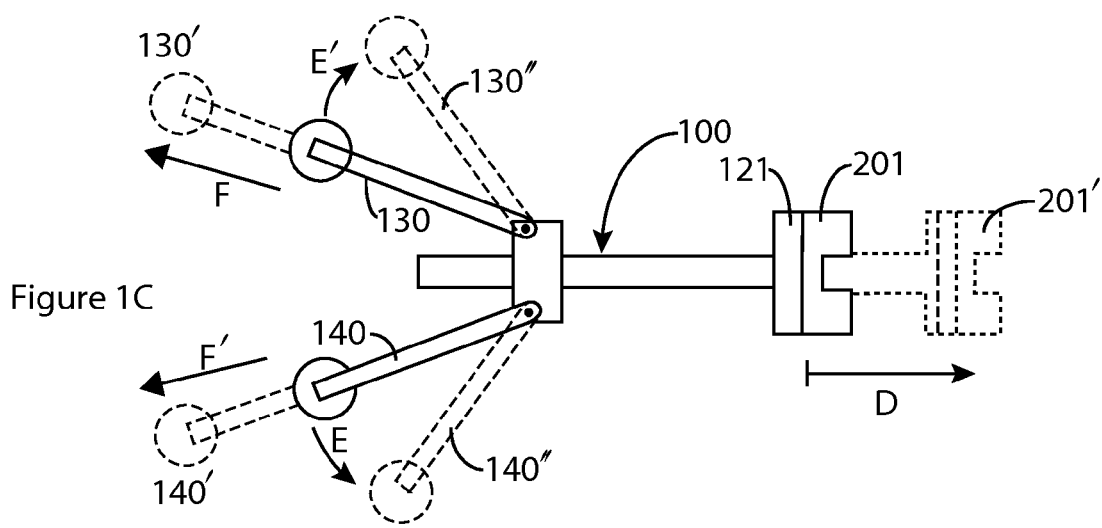
FIG. 1C is an exemplary top view of the cantilever mount for supporting laser metrology equipment on one or more surfaces, according to an embodiment of the invention.

FIG. 1C is an exemplary top view of the cantilever mount 100 for supporting laser metrology equipment on one or more surfaces, according to an embodiment of the invention. FIG. 1C shows the laser metrology equipment 201 attached to the mount 100. FIG. 1C shows the adjustability of the mast 120, the first leg 130, and second leg 140. FIG. 1C shows each of these elements, i.e., the mast 120, the first leg 130, and the second leg 140 in two different positions. However as outlined below, these elements are adjustable to a plurality of positions not specifically shown in the illustration.

In dotted lines, FIG. 1C shows the mast 120 in an extended position, thereby extending the position of the laser metrology equipment 201 to a position 201'. The mast 120 is an erecting/retracting structure, the adjustable structure facilitated by using known elements such as telescoping tubes, hydraulics, and the like. The direction of extension is shown by arrow D. By extending the mast 120 as shown, the laser metrology equipment 201 may have access to positions that it would not ordinarily have, thereby facilitating improved data collection. For example, when the cantilever mount 100 and laser metrology equipment 201 combination is used on a ship, the mast 120 may be extended as shown, to project the laser metrology equipment 201 to overhang off the side of the ship hull. This would be useful in scenarios in there is damage to the side of a waterborne ship and the laser metrology equipment 201 must be mounted over the side of the ship to capture accurate data for damage control. It should be noted that the movement as shown by arrows D is in the XY plane shown in FIG. 1A.

FIG. 1C shows the legs 130 and 140 in extended positions 130' and 140', respectively. This extension provides additional options for the positioning of the first and second anchors 138 and 148 along a desired surface or surfaces. The legs 130 and 140 may be erecting/retracting structures, the adjustability facilitated by using known elements such as telescoping tubes, hydraulics, and the like. The directions of extension are shown by arrows F and F'. Again, by extending the legs 130 and 140 as shown, the laser metrology equipment 201 may have access to positions that it would not ordinarily have, thereby facilitating improved data collection.

FIG. 1C also shows in dotted lines, the first and the second legs 130 and 140 in adjusted positions 130" and 140", with arrows E and E' showing each respective arch of adjustability. To facilitate this movement, each of the first and second legs 130 and 140 are pivotally connected with the respective first and second leg opening 114 and 116, with known pivoting elements, such as hinges, bolts, and the like. This adjustability facilitates positioning the cantilever mount 100 at different locations on the hull depending on the condition of the hull surfaces. Although not specifically shown, it should be noted that the legs 130 and 140 may also pivot from the extended positions 130" and 140" in directions E and E'. As outlined above, in embodiments in which the first, second, and third anchors, 138, 148, and 118 are magnetic, the cantilever mount 100 may be placed on ferrous surfaces that are horizontal, vertical or inclined. According to another embodiment, the anchors 138, 148, and 118 may be clamps having a hook or an opening (not shown) through which a securing device such as a screw, a bolt, or the like may be threaded for attaching the respective anchor 138, 148, or 118 to the one or more surfaces. According to this embodiment, the one or more surfaces may include compression panels that are able to receive securing devices such as screws e.g., at any desired location along that surface. It should be noted that the movement as shown by arrows E, E', F and F' is in the XY plane shown in FIG. 1A.

Figure 1D:
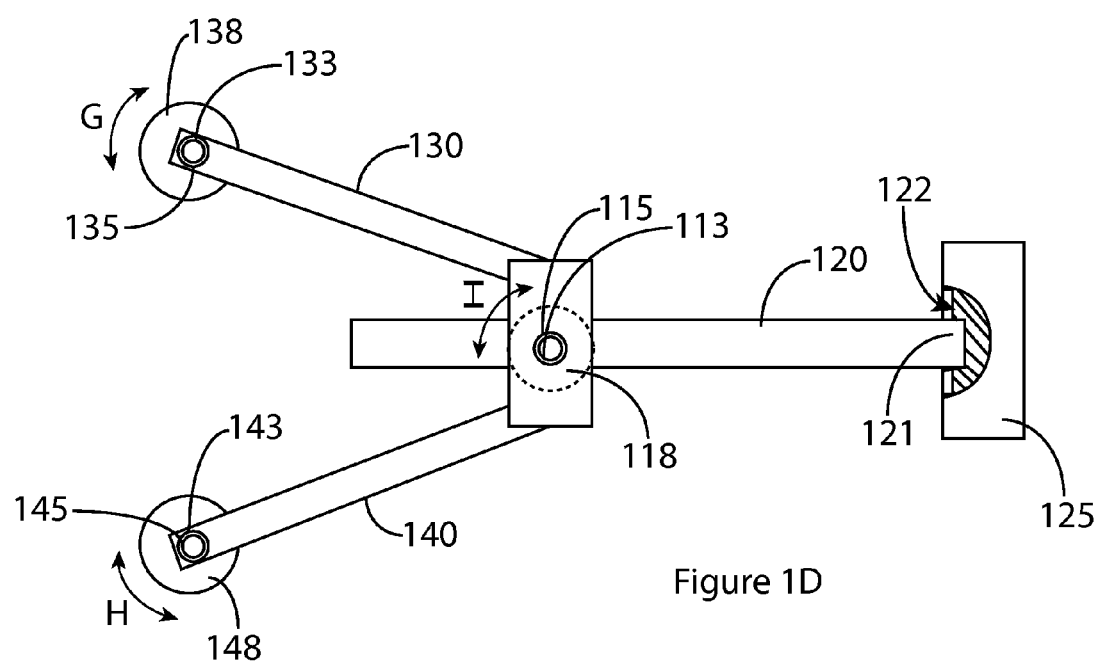
FIG. 1D is an exemplary top view of the cantilever mount for supporting laser metrology equipment on one or more surfaces, according to an embodiment of the invention.

FIG. 1D is an exemplary top view of the cantilever mount 100 for supporting laser metrology equipment on one or more surfaces, according to an embodiment of the invention. The embodiment of FIG. 1D shows additional adjustability features. As shown in FIG. 1D, the far end 121 of the mast 120 is connected to the attachment device 125, which is for supporting the laser metrology equipment 201. FIG. 1D also shows a coupling device 122 between the far end 121 and the attachment device 125. This coupling device 122 may be a ball head or a gimbal head that facilitates the multi-dimensional rotation of the attachment device 125, in all three planes, about the mast 120 to a plurality of selected positions. This feature allows for the mounting of the laser metrology equipment 201 in a plurality of desired orientations.

The embodiment of FIG. 1D also shows additional adjustability features directed towards each of the first, second, and third anchors, 138, 148, and 118. As shown, each of the first and second anchors 138 and 148 are connected to respective legs 130 and 140 via pins 133 and 143, which extend upwards into coupling devices 135 and 148, respectively. The coupling devices 135 and 145 may be ball joints or gimbals that facilitate the multi-dimensional rotation, allowing the anchors 138 and 148 to rotate and pivot as desired. As shown in FIG. 1D, the coupling devices 135 and 145 provide anchor rotation as shown by arrows G and H. This rotation shown by arrows G and H represent the rotation of the anchors 138 and 148 about their respective pins 133 and 143.

The anchors 138 and 148 may also pivot about respective Z-direction axes, extending out of the page through the respective pins 133 and 143. It should be understood that because the anchors 138 and 148 are rotatable about their respective pins 133 and 143, when the pins 133 and 143 pivot, any rotation about these pins changes the plane in which the anchors 138 and 148 rotate. FIG. 1D is representative of the pins 138 and 148 in a vertical Z-direction orientation, and therefore rotation about these pins is in a substantially horizontal plane. However, it should be understood that the planes of rotation may change, depending on the pivoting of the pins 133 and 143.

Similarly, the third anchor 118 is connected to the hip 110 via a pin 113. Coupling device 115 allows rotation and pivoting, similar to what has been described regarding the legs 130 and 140. The coupling device 115 may be a ball joint or a gimbal that facilitates the multi-dimensional rotation, allowing the hip 110 to pivot and rotate as desired. As shown in FIG. 1D, the coupling device 115 provides anchor rotation as shown by arrow I, which is the rotation about the pin 113. The anchor 118 may also pivot about a Z direction axis, extending out of the page through the pin 113.

As outlined above with respect to the anchors 138 and 148, because the anchor 118 is rotatable about the pins 113, when the pins 113 pivots, any rotation about this pin 113 changes the plane in which the anchor 118 rotates.

As stated above, the features illustrated in FIGS. 1C and 1D, and outlined above, provide adjustability that facilitates the collection of laser metrology data in scenarios in which it has traditionally been difficult to accomplish. For example, ship decks may have obstructions or interferences, and it is not possible to position the laser metrology apparatus on a single flat surface. The adjustability of the legs 130 and 140 as shown in FIG. 1C allows the mount 100 to be positioned on different/uneven surfaces at different angles, in which one leg is adjusted to be longer than the other. As stated above, the mast 120 may be extended as shown in FIG. 1C to project the laser metrology equipment 201 to overhang off the side of the ship hull. The adjustable features outlined may also be used to extend the laser metrology equipment into an open doorway or hatchway.

FIG. 2 is a flow diagram, broadly outlining steps involved in the method 200 of taking laser metrology readings on a ship, according to an embodiment of the invention. Step 210 is the providing of the cantilever mount 100 for supporting the laser metrology equipment 201. The mount 100 is provided with the elements as outlined above with respect to FIGS. 1A-1D. As outlined, the mount 100 is provided with a hip support 110, an adjustable mast 120, first and second pivotable legs 130 and 140, and first, second, and third anchors 138, 148, and 118 that are rotatable and pivotable as outlined above. The anchors 138, 148, and 118 may be magnetic for attaching to ferrous surfaces, or alternatively be clamps having a hook end (not shown) and a compression mechanism for attaching the mount 100 to one or more surfaces of any material, device, or component, ferrous or non-ferrous.

Step 220 is the attaching of the laser metrology equipment 201 to the cantilever mount 100. As outlined above, the mast 120 has a far end 121, having an attachment device 125 for holding and attaching the laser metrology equipment 201 to the mount 100. The attachment device 125 may include known devices such as tethers, hook and loop arrangements, hooks, clips, straps, bolts, screws, and the like to secure the laser metrology equipment to the adjustable mast 120 of the mount 100.

Step 230 is the adjustable positioning of the cantilever mount 100 on one or more hull surfaces of the ship, or any other location aboard the ship where laser metrology is needed to capture data. As outlined above and as shown in FIGS. 1C and 1D, the mast 120, the first leg 130, second leg 140, the anchors 118, 138, and 148, and the attachment device 125 are all adjustable, which facilitates the positioning of the mount 100 and attached metrology equipment 201 in positions that optimize the operation of the laser metrology equipment 201. FIG. 1C shows the mast 120, the first leg 130, and the second leg 140 in two different positions. For example as outlined above, the mast 120 may be extended as shown in FIG. 1C to project the laser metrology equipment 201 to overhang off the side of the ship hull. FIG. 1D shows an embodiment in which the attachment device 125 is rotatable, allowing for the mounting of the laser metrology equipment 201 in a plurality of desired orientations. Additionally, the anchors 118, 138, and 148, facilitate flexibility in the positioning of the mount 100, but additionally they make it easier to install the mount 100 on deck surfaces or the like.

The cantilever mount 100 as described above, is designed to hold the laser metrology equipment and to position the equipment to facilitate data collection in circumstances that have been traditionally difficult for data collection, or generally in non-standard applications. According to one particular example, the flexible adjustable mount 100 is designed for situations in which there is damage to the side of a waterborne ship and the laser metrology equipment 201 must be mounted over the side of the ship to capture accurate data for damage control. The mount 100 may also be used in situations on decks that have obstructions or interferences, and it is not possible to position the laser metrology apparatus on a single flat surface. The adjustability of the legs 130 and 140 as shown in FIG. 1C allows the mount 100 to be positioned on different/uneven surfaces at different angles, in which one leg is adjusted to be longer than the other.

In addition to this flexibility, as outlined above, in embodiments in which the first, second, and third anchors, 138, 148, and 118 are magnetic, the cantilever mount 100 may be adjustably positioned on ferrous surfaces that are horizontal, vertical or inclined. Alternatively, according to this method, the anchors 138, 148, and 118 may be clamps having a hook or an opening (not shown) through which a securing device such as a screw, a bolt, or the like may be threaded for attaching the respective anchor 138, 148, or 118 to the one or more surfaces. According to this embodiment, the one or more surfaces may include compression panels that are able to receive securing devices such as screws e.g., at any desired location along that surface. According to one particular embodiment, magnetic anchors 138, 148, and 118, may be interchangeable with clamp anchors.

Step 240 is the taking of readings. In this step, the laser metrology equipment 201 is operated in a known manner. It should be noted that improved readings are acquired because of the flexibility in positioning of the equipment 201, as outlined above. The flexibility in positioning of the equipment 201 is due to the structure of the mount 100, including the adjustable elements such as the mast 120 and first and second legs 130 and 140, as well as the rotatable attachment device 125. Additional flexibility may be provided by embodiments utilizing magnetic anchors 118, 138, and 148, which may also be adjustable, for attachment to ferrous surfaces, or by using anchors that are clamps as outlined above.

What has been described and illustrated herein are preferred embodiments of the invention along with some variations. The terms, descriptions and figures used herein are set forth by way of illustration only and are not meant as limitations. Additionally, method steps may be performed in different orders. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A cantilever mount for supporting laser metrology equipment on one or more surfaces, the cantilever mount comprising:
   a hip support having a first leg opening and a second leg opening;
   an adjustable mast being elongated in an XY plane of an XYZ coordinate system, the adjustable mast having a far end;
   an attachment device for holding and attaching the laser metrology equipment, the attachment device connected to the far end of the mast;
   a first leg having an anchor end and a hip end, the first leg elongated in said XY plane, with the hip end positioned within the first leg opening;
   a second leg having an anchor end and a hip end, the second leg elongated in said XY plane with the hip end positioned within the second leg opening;
   a first anchor mounted at the anchor end of the first leg, the first anchor positioned below the first leg in a Z-direction of said XYZ coordinate system;
   a second anchor mounted at the anchor end of the second leg, the second anchor below the second leg in said Z-direction of said XYZ coordinate system; and
   a third anchor mounted at the hip support, the third anchor below the hip support in said Z-direction of said XYZ coordinate system, wherein each of the first anchor, the second anchor, and the third anchor contact said one or more surfaces upon which the cantilever mount is supported.

2. The cantilever mount of claim 1, wherein the first leg is pivotally mounted within the first leg opening of the hip support, allowing for pivotal adjustment of the first leg in said XY plane, and wherein the second leg is pivotally mounted within the second leg opening of the hip support, allowing for pivotal adjustment of the second leg in said XY plane.

3. The cantilever mount of claim 2, wherein each of the adjustable mast, the first leg, and the second leg, is an erecting/retracting mast facilitating the projection of the laser metrology equipment to overhang said one or more surfaces upon which the mount is supported.

4. The cantilever mount of claim 3 further comprising an attachment device for holding said laser metrology equipment rotatably attached at the far end of the mast.

5. The cantilever mount of claim 4, wherein each of the first, second, and third anchors are connected to the respective first leg, second leg, and hip, via a respective coupling device, that allows each of the first, second, and third anchors to rotate and pivot.

6. The cantilever mount of claim 5, wherein each of the first, second, and third anchors are magnetic, allowing for the mounting of the cantilever mount in any desired orientation on ferrous surfaces.

7. The cantilever mount of claim 5, wherein each of the first, second, and third anchors are clamps that are attachable to the one or more surfaces.

8. A method of taking laser metrology data readings on a ship, the method comprising:
   providing a cantilever mount for supporting laser metrology equipment on one or more surfaces on the ship, the cantilever mount comprising:
      a hip support having a first leg opening and a second leg opening;
      an adjustable mast being elongated in an XY plane of an XYZ coordinate system, the adjustable mast having a far end;
      an attachment device for holding and attaching the laser metrology equipment, the attachment device connected to the far end of the mast;
      a first leg having an anchor end and a hip end, the first leg elongated in said XY plane, with the hip end positioned within the first leg opening;
      a second leg having an anchor end and a hip end, the second leg elongated in said XY plane with the hip end positioned within the second leg opening;
      a first anchor mounted at the anchor end of the first leg, the first anchor positioned below the first leg in a Z-direction of said XYZ coordinate system;

a second anchor mounted at the anchor end of the second leg, the second anchor below the second leg in said Z-direction of said XYZ coordinate system; and a third anchor mounted at the hip support, the third anchor below the hip support in said Z-direction of said XYZ coordinate system;

attaching laser metrology equipment to the cantilever mount, wherein the laser metrology equipment is fastened to the attachment device at the far end of the adjustable mast;

adjustably positioning the cantilever mount on one or more surfaces of the ship, wherein each of the first anchor, the second anchor, and the third anchor contact said one or more surfaces upon which the cantilever mount is supported; and taking data readings with the laser metrology equipment.

9. The method of claim 8, wherein in the providing of the cantilever mount, the first leg is pivotally mounted within the first leg opening of the hip support, the second leg is pivotally mounted within the second leg opening of the hip support, and the first leg, the second leg, and the mast are erecting/retracting structures, and wherein in adjustably positioning the cantilever mount on the hull surface, the first leg may be pivotally adjusted in said XY plane, the second leg may be pivotally adjusted in the XY plane, and each of the first leg, the second leg, and the mast may be extended to move the laser metrology equipment in an overhanging position, wherein the laser metrology equipment hangs over the side of the ship.

10. The method of claim 9, wherein in the providing of the cantilever mount, each of the first, second, and third anchors are magnetic, and wherein in the adjustable positioning of the cantilever mount, the magnetic anchors are attached to one or more ferrous surfaces.

11. The method of claim 10, wherein in the providing of the cantilever mount, each of the first, second, and third anchors are clamps that are attached to the one or more surfaces.

\* \* \* \* \*